US012641415B2

(12) United States Patent (10) Patent No.: US 12,641,415 B2
Toma et al. (45) Date of Patent: May 26, 2026

(54) HANDLING OF MUSIM GAPS COLLISION IN MOBILE COMMUNICATIONS

(71) Applicant: MediaTek Singapore Pte. Ltd., Singapore (SG)

(72) Inventors: Ogeen Hanna Toma, Cambridge (GB); Tsang-Wei Yu, Hsinchu (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 384 days.

(21) Appl. No.: 18/216,039

(22) Filed: Jun. 29, 2023

(65) Prior Publication Data

US 2024/0048960 A1 Feb. 8, 2024

Related U.S. Application Data

(60) Provisional application No. 63/370,287, filed on Aug. 3, 2022.

(51) Int. Cl.
*H04W 72/12* (2023.01)
*H04W 8/18* (2009.01)

(52) U.S. Cl.
CPC ........... *H04W 8/186* (2013.01); *H04W 8/183* (2013.01)

(58) Field of Classification Search
None
See application file for complete search history.

(56) References Cited

FOREIGN PATENT DOCUMENTS

WO WO-2022086227 A1 * 4/2022 ............ H04W 68/12

OTHER PUBLICATIONS

Jung Sangyeob, Method and Device For supporting Multi UE . . . , 2022.*

* cited by examiner

*Primary Examiner* — Gary Lafontant
(74) *Attorney, Agent, or Firm* — Andy M. Han; Han IP PLLC

(57) ABSTRACT

Examples pertaining to handling of multi-Universal Subscriber Identity Module (MUSIM) gaps collision in mobile communications are described. A multiple-Universal Subscriber Identity Modules (MUSIM) user equipment (UE) applies different priorities with respect to MUSIM gaps and legacy measurement gaps (MGs). The UE performs wireless communications such that a collision between MUSIM gaps and legacy MGs is handled.

20 Claims, 6 Drawing Sheets

100

Figure 6:
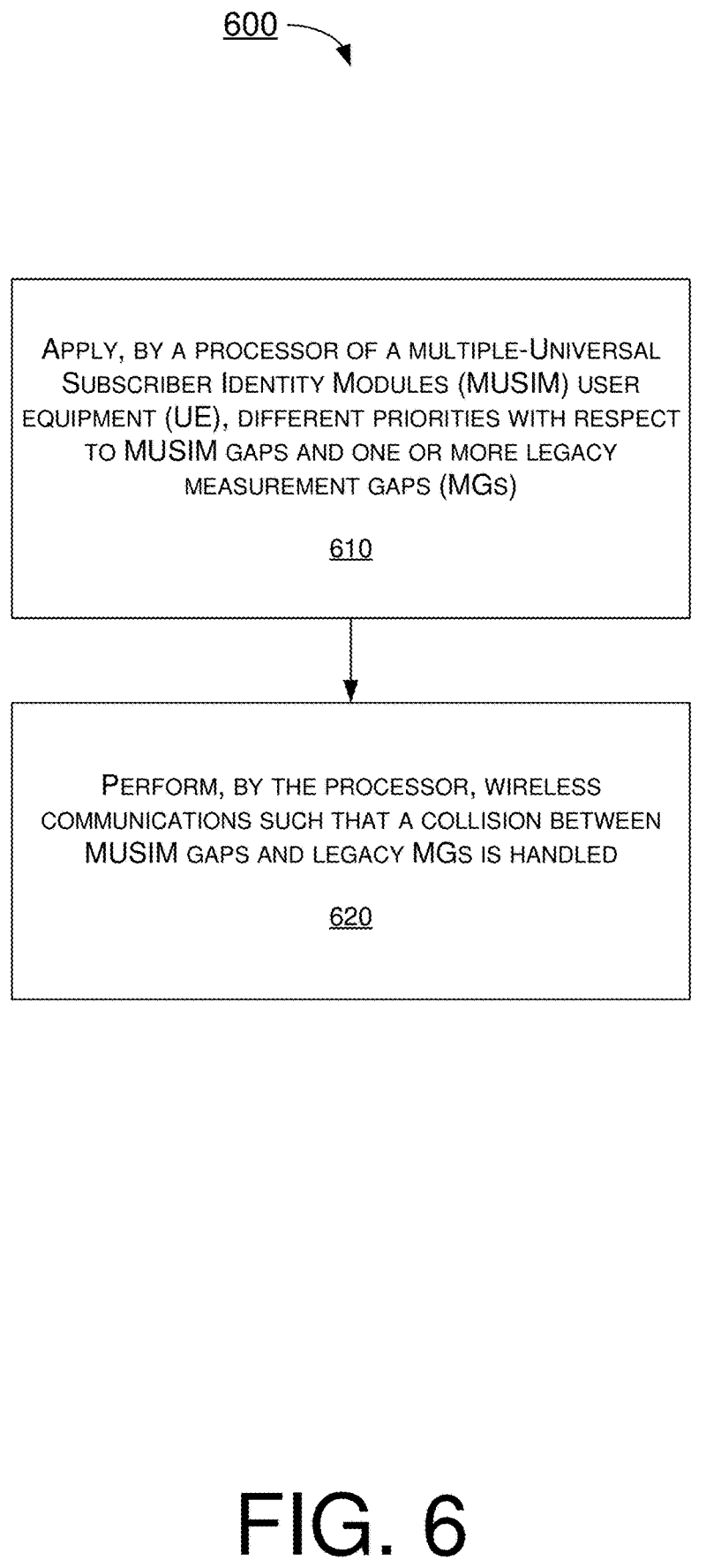

600 ⟶

APPLY, BY A PROCESSOR OF A MULTIPLE-UNIVERSAL SUBSCRIBER IDENTITY MODULES (MUSIM) USER EQUIPMENT (UE), DIFFERENT PRIORITIES WITH RESPECT TO MUSIM GAPS AND ONE OR MORE LEGACY MEASUREMENT GAPS (MGS)

610

PERFORM, BY THE PROCESSOR, WIRELESS COMMUNICATIONS SUCH THAT A COLLISION BETWEEN MUSIM GAPS AND LEGACY MGS IS HANDLED

HANDLING OF MUSIM GAPS COLLISION IN MOBILE COMMUNICATIONS

CROSS REFERENCE TO RELATED PATENT APPLICATION(S)

The present disclosure is part of a non-provisional application claiming the priority benefit of U.S. patent application Ser. No. 63/370,287, filed 3 Aug. 2022, the content of which herein being incorporated by reference in its entirety.

TECHNICAL FIELD

The present disclosure is generally related to mobile communications and, more particularly, to handling of multi-Universal Subscriber Identity Module (multi-USIM or MUSIM) gaps collision in mobile communications.

BACKGROUND

Unless otherwise indicated herein, approaches described in this section are not prior art to the claims listed below and are not admitted as prior art by inclusion in this section.

In wireless communications, such as mobile communications under the $3^{rd}$ Generation Partnership Project (3GPP) standards including $5^{th}$ Generation (5G) New Radio (NR) and $4^{th}$ Generation (4G) Evolved Packet Service (EPS), when a user equipment (UE) implementation supports MUSIM (e.g., Subscriber Identity Module (SIM) #1 on Network A and SIM #2 on Network B), the UE can request MUSIM gap from Network A to monitor activities of Network B (e.g., paging, measurement, and system information (SI) reading). However, under current 3GPP specifications, a MUSIM operation could create unpredictable measurement performance for Network A. That is, collision, or overlap, between MUSIM gaps and legacy measurement gaps (e.g., measurement gaps based on Release 15 (Rel-15) to Release 17 (Rel-17)) can cause unpredictable measurement performance for Network A, and the UE would be required to handle such collisions. For example, legacy gaps can be classified into single gaps (e.g., Rel-15/16 measurement gaps) and multiple gaps (e.g., Rel-17 concurrent measurement gaps). For MUSIM operation, a UE can also be configured with up to four MUSIM gaps (e.g., three periodic and one periodic MUSIM gaps). In such cases, MUSIM gaps collision with the legacy measurement gaps (single or multiple measurement gaps) could happen. As a result, measurements on both Network A and Network B can be affected in case no proper collision handling mechanism is defined and implemented. Therefore, there is a need for a solution of handling of MUSIM gaps collision in mobile communications.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

One objective of the present disclosure is propose schemes, concepts, designs, systems, methods and apparatus pertaining to handling of MUSIM gaps collision in mobile communications. It is believed that the above-described issue(s) would be avoided or otherwise alleviated by implementing one or more of the proposed schemes described herein.

In one aspect, a method may involve a processor of a MUSIM UE applying different priorities with respect to MUSIM gaps and one or more legacy measurement gaps (MGs). The method may also involve the processor performing wireless communications such that a collision between MUSIM gaps and legacy MGs is handled.

In another aspect, an apparatus may include a transceiver and a processor coupled to the transceiver. The transceiver may be configured to communicate wirelessly. The processor may apply different priorities with respect to MUSIM gaps and one or more legacy MG. The processor may also perform, via the transceiver, wireless communications such that a collision between MUSIM gaps and legacy MGs is handled.

It is noteworthy that, although description provided herein may be in the context of certain radio access technologies, networks and network topologies such as $5^{th}$ Generation System (5GS) and 4G EPS mobile networking, the proposed concepts, schemes and any variation(s)/derivative(s) thereof may be implemented in, for and by other types of wireless and wired communication technologies, networks and network topologies such as, for example and without limitation, Ethernet, Universal Terrestrial Radio Access Network (UTRAN), E-UTRAN, Global System for Mobile communications (GSM), General Packet Radio Service (GPRS)/Enhanced Data rates for Global Evolution (EDGE) Radio Access Network (GERAN), Long-Term Evolution (LTE), LTE-Advanced, LTE-Advanced Pro, IoT, Industrial IoT (IIoT), Narrow Band Internet of Things (NB-IoT), and any future-developed networking technologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 6 is a flowchart of an example process in accordance with an implementation of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to handling of MUSIM gaps collision in mobile communications. According to the present disclosure, a number of possible solutions may be implemented separately or jointly. That is, although these possible solutions may be described below separately, two or more of these possible solutions may be implemented in one combination or another.

Figure 1:
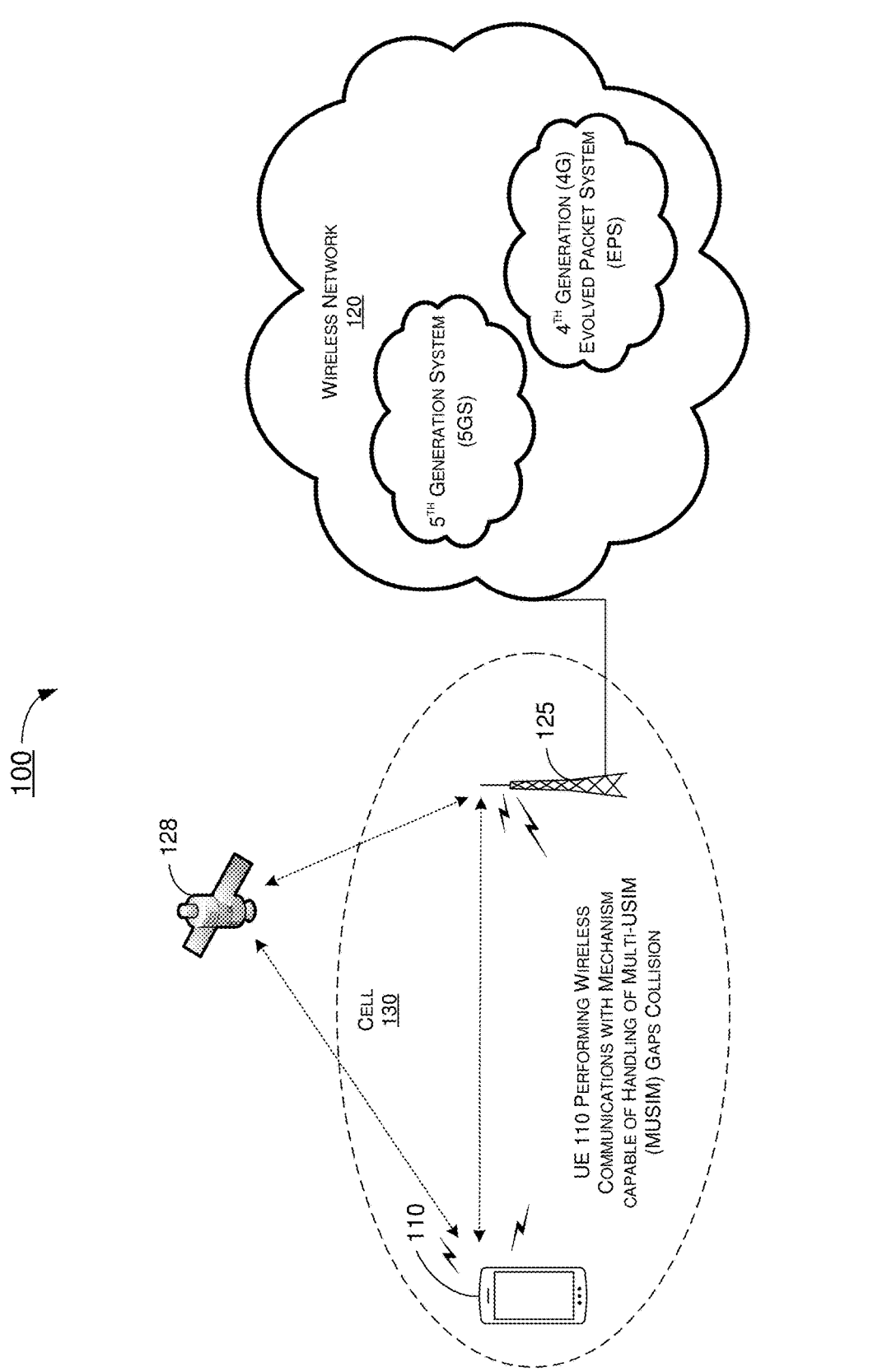
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2-FIG. 6 illustrate examples of implementation of various proposed schemes in network environment 100 in accordance with the present disclosure. The following description of various proposed schemes is provided with reference to FIG. 1-FIG. 6.

Referring to FIG. 1, network environment 100 may involve a UE 110 and a wireless network 120, which may include a 5$^{th}$ Generation System (5GS) (and, optionally, an EPS). Depending on channel condition, availability and/or other factor(s), UE 110 may be in wireless communication with wireless network 120 via one or more terrestrial network nodes (e.g., base station(s) such as eNB, gNB and/or transmission/reception point (TRP)) and/or one or more non-terrestrial network nodes (e.g., satellite(s)). For simplicity in illustration and without limiting the scope of the present disclosure, UE 110 may be associated with or otherwise in communication with a cell 130 corresponding to a terrestrial network node 125 (e.g., gNB, eNB or TRP) and/or a non-terrestrial network node 128 (e.g., satellite) of wireless network 120. In network environment 100, UE 110 and wireless network 120 may implement various schemes pertaining to handling of MUSIM gaps collision in mobile communications in accordance with the present disclosure, as described below. It is noteworthy that, while the various proposed schemes may be individually or separately described below, in actual implementations each of the proposed schemes may be utilized individually or separately. Alternatively, some or all of the proposed schemes may be utilized jointly.

Figure 2:
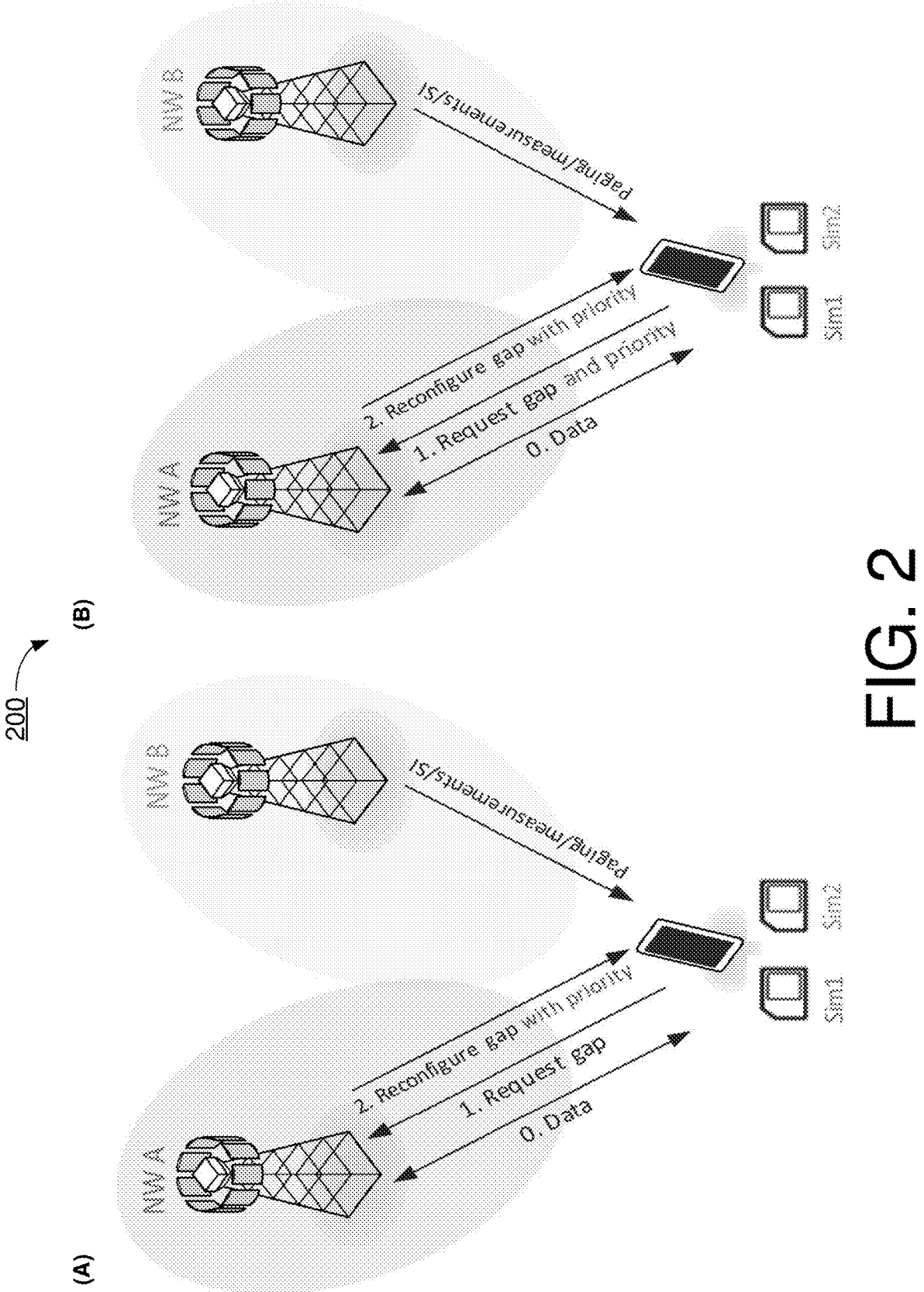
FIG. 2 is a diagram of an example scenario under a proposed scheme in accordance with the present disclosure.

FIG. 2 illustrates an example scenario 200 under a proposed scheme in accordance with the present disclosure. Under the proposed scheme, collision between MUSIM gaps and legacy gaps may be handled by prioritization or applying priority (e.g., SIM#1 having a higher priority than SIM#2, or vice versa), which may be either configured by Network A (e.g., network 120) or requested by a UE (e.g., UE 110). Referring to part (A) of FIG. 2 which pertains to gap priority being configured by a network, under the proposed scheme, Network A may configure the UE with MUSIM gaps and legacy gaps with their corresponding priorities. For instance, initially, Network A and UE may exchange data while, on the other hand, the UE may detect paging, measurements and/or SI from Network B. Then, the UE may request for gap(s) from Network A. In response, Network A may configure/reconfigure gap(s) with priority/priorities for UE and transmit the configuration to the UE, which in turn applies the priority/priorities to avoid collision between MUSIM gaps and legacy MGs.

Referring to part (B) of FIG. 2 which pertains to gap priority being requested by a UE, under the proposed scheme, since the UE is aware of configurations of Network B, the UE may request appropriate priorities for different gaps from Network A. For instance, initially, Network A and UE may exchange data while, on the other hand, the UE may detect paging, measurements and/or SI from Network B. Then, the UE may request for gap(s) and priority/priorities from Network A. In response, Network A may reconfigure gap(s) with priority/priorities for UE and transmit the new configuration to the UE, which in turn applies the priority/priorities to avoid collision between MUSIM gaps and legacy MGs.

Figure 3:
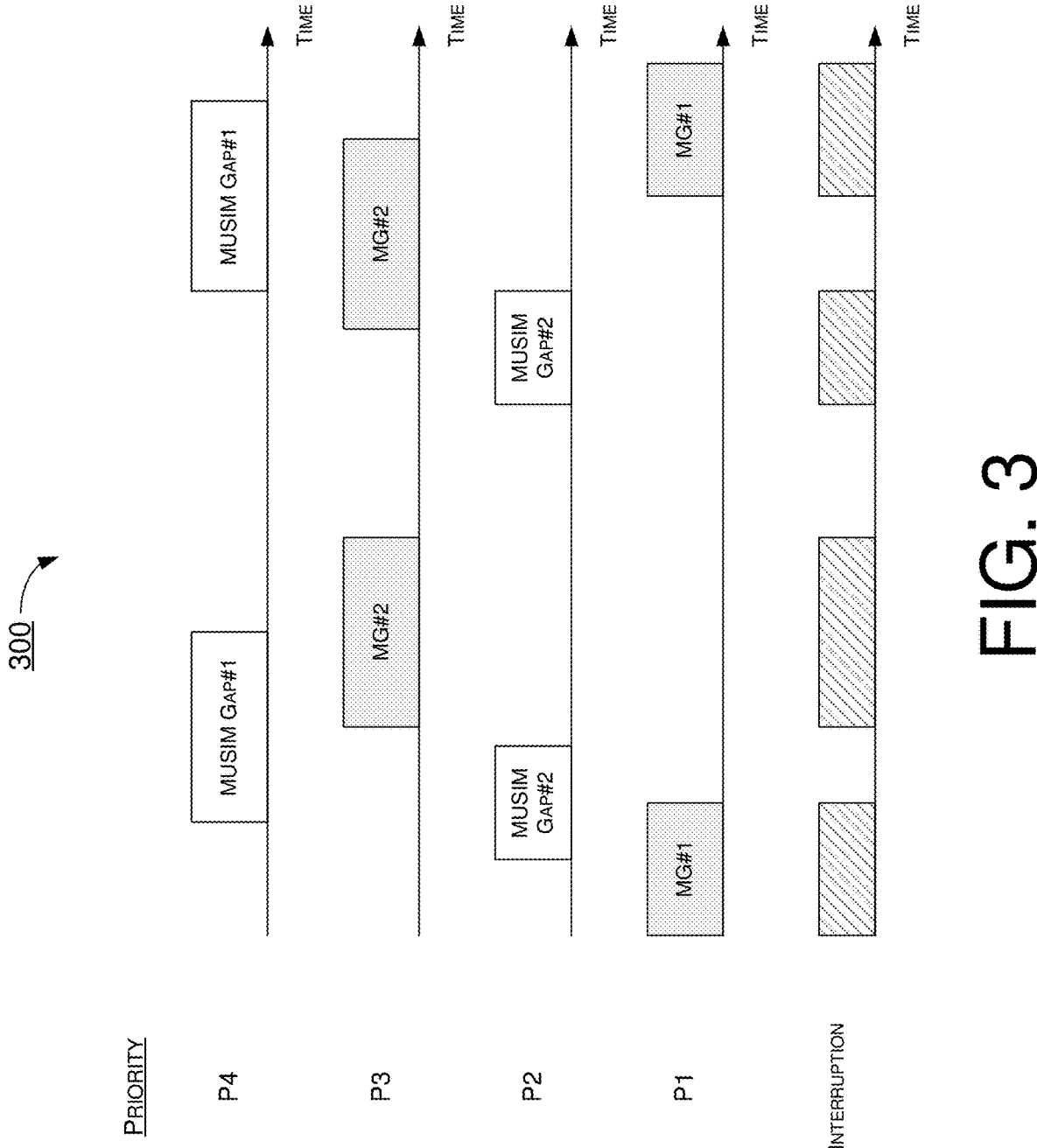
FIG. 3 is a diagram of an example scenario under a proposed scheme in accordance with the present disclosure.

FIG. 3 illustrates an example scenario 300 under a proposed scheme in accordance with the present disclosure. Under the proposed scheme, a priority rule may be applied for handling MUSIM gaps collision with legacy gaps. That is, different priorities may be applied for each individual gap. Accordingly, a UE (e.g., UE 110) may only perform measurements associated to a higher-priority gap while low-priority gap occasions may be considered as dropped. Moreover, data scheduling may be resumed on the dropped gap occasions.

In scenario 300, legacy MGs #1 and #2 may be associated with Network B while MUSIM gaps #1 and #2 may be associated with Network A. Moreover, MG #1 may have a first (or the highest) priority level P1, MUSIM gap #2 may have a second (or the second highest) priority level P2, MG #2 may have a third (or the third highest) priority level P3, and MUSIM gap #1 may have a fourth (or the lowest) priority level P4 among the four priority levels. As shown in FIG. 3, since there are collisions (or overlaps) between MG #1/#2 and MUSIM gap #1/#2, and since the priority level of MG #1 is higher than that of MUSIM gap #2 and the priority level of MG #2 is higher than that of MUSIM gap #1, 300 the MUSIM gap #1/#2 and MG #2 occasions are dropped, resulting in periods of interruption (corresponding to the measurement gaps not dropped). Notably, data scheduling may be resumed or otherwise performed on dropped gap occasions (e.g., during the intervals between adjacent periods of interruption).

Figure 4:
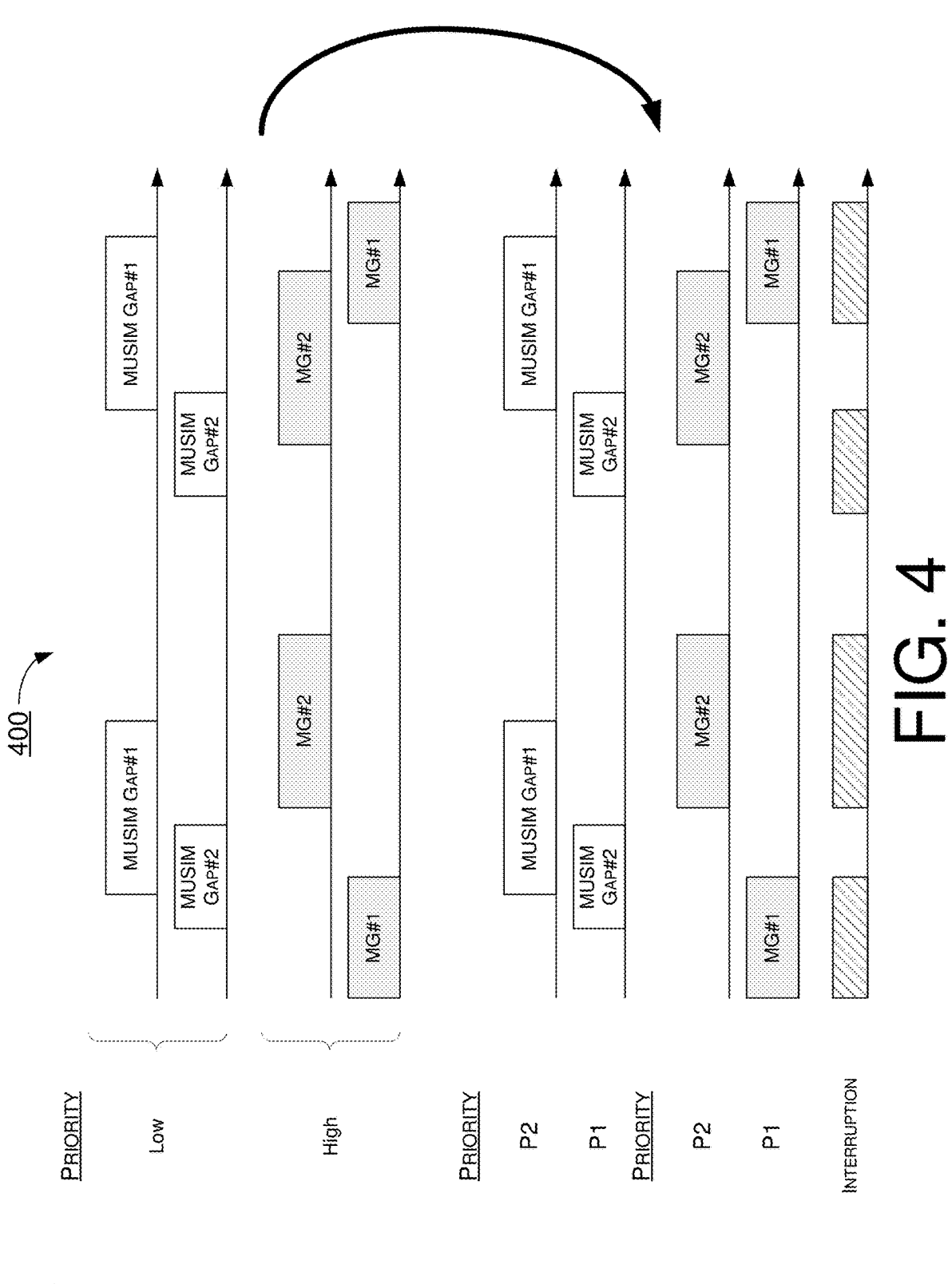
FIG. 4 is a diagram of an example scenario under a proposed scheme in accordance with the present disclosure.

FIG. 4 illustrates an example scenario 400 under a proposed scheme in accordance with the present disclosure. Under the proposed scheme, a group priority may be applied for each of MUSIM gaps and legacy gaps, and then different priorities may be applied for each group, as shown in FIG. 4. Under this proposed scheme, a UE (e.g., UE 110) may request for a dedicated priority only for a specific gaps group (e.g., MUSIM gaps), while other priorities (e.g., for legacy MGs) may be configured a network (e.g., network 120).

In scenario 400, a group of legacy MGs (e.g., associated with Network A) may have a higher priority while a group of MUSIM gaps (e.g., associated with Network B) may have a lower priority, or vice versa. Moreover, within each group, individual MGs and individual MUSIM gaps may have different priority levels. For instance, within the group of legacy MGs, MG #1 may have a higher priority (P1) while MG #2 may have a lower priority (P2). Similarly, within the group of MUSIM gaps, MUSIM gap #2 may have a higher priority (P1) while MUSIM gap #1 may have a lower priority (P2).

In view of the above, it is believed that one of ordinary skill in the art would appreciate that the various proposed schemes in accordance with the present disclosure may address or otherwise alleviate issue(s) related to MUSIM gaps collision. Under one proposed scheme, a network (e.g., network 120) may configure a UE (e.g., UE 110) with a dedicated priority for each gap of a plurality of gaps, either as a group priority for MUSIM gaps and legacy gaps or as individual priorities. Under another proposed scheme, the UE may determine a dedicated priority for each gap of the plurality of gaps (either as a group priority for MUSIM gaps and legacy gaps or as individual priorities) and the UE may then request the dedicated priority from the network. Under yet another proposed scheme, the UE may alternatively request a priority only for a group of MUSIM gaps while other priorities may be configured by the network.

Illustrative Implementations

Figure 5:
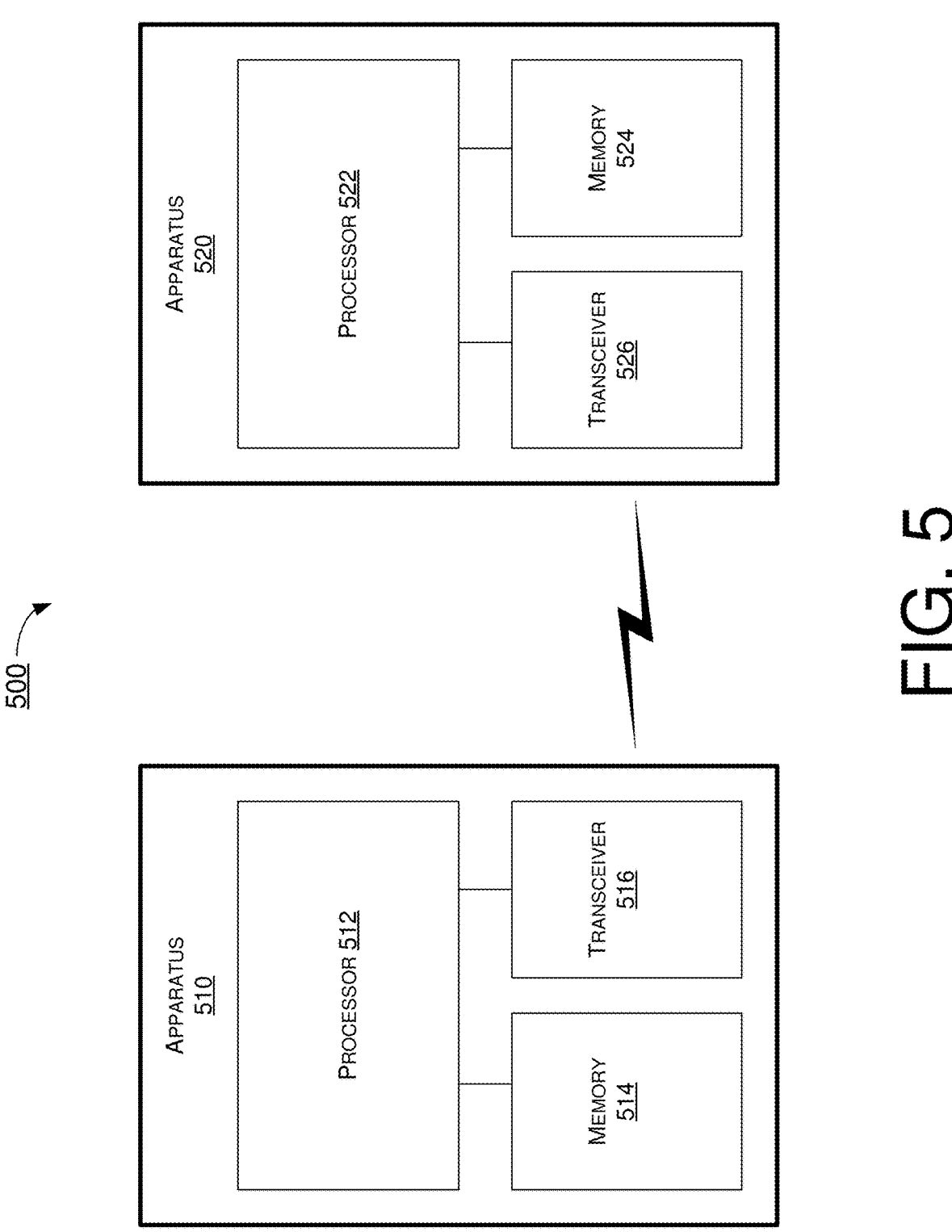
FIG. 5 is a block diagram of an example communication system in accordance with an implementation of the present disclosure.

FIG. 5 illustrates an example communication system 500 having at least an example apparatus 510 and an example apparatus 520 in accordance with an implementation of the present disclosure. Each of apparatus 510 and apparatus 520 may perform various functions to implement schemes, techniques, processes and methods described herein pertaining to handling of MUSIM gaps collision in mobile communications, including the various schemes described above with respect to various proposed designs, concepts, schemes, systems and methods described above, including network environment 100, as well as processes described below.

Each of apparatus 510 and apparatus 520 may be a part of an electronic apparatus, which may be a network apparatus or a UE (e.g., UE 110), such as a portable or mobile apparatus, a wearable apparatus, a vehicular device or a vehicle, a wireless communication apparatus or a computing apparatus. For instance, each of apparatus 510 and apparatus 520 may be implemented in a smartphone, a smart watch, a personal digital assistant, an electronic control unit (ECU) in a vehicle, a digital camera, or a computing equipment such as a tablet computer, a laptop computer or a notebook computer. Each of apparatus 510 and apparatus 520 may also be a part of a machine type apparatus, which may be an IoT apparatus such as an immobile or a stationary apparatus, a home apparatus, a roadside unit (RSU), a wire communication apparatus or a computing apparatus. For instance, each of apparatus 510 and apparatus 520 may be implemented in a smart thermostat, a smart fridge, a smart door lock, a wireless speaker or a home control center. When implemented in or as a network apparatus, apparatus 510 and/or apparatus 520 may be implemented in an eNodeB in an LTE, LTE-Advanced or LTE-Advanced Pro network or in a gNB or TRP in a 5G network, an NR network or an IoT network.

In some implementations, each of apparatus 510 and apparatus 520 may be implemented in the form of one or more integrated-circuit (IC) chips such as, for example and without limitation, one or more single-core processors, one or more multi-core processors, one or more complex-instruction-set-computing (CISC) processors, or one or more reduced-instruction-set-computing (RISC) processors. In the various schemes described above, each of apparatus 510 and apparatus 520 may be implemented in or as a network apparatus or a UE. Each of apparatus 510 and apparatus 520 may include at least some of those components shown in FIG. 5 such as a processor 512 and a processor 522, respectively, for example. Each of apparatus 510 and apparatus 520 may further include one or more other components not pertinent to the proposed scheme of the present disclosure (e.g., internal power supply, display device and/or user interface device), and, thus, such component(s) of apparatus 510 and apparatus 520 are neither shown in FIG. 5 nor described below in the interest of simplicity and brevity.

In one aspect, each of processor 512 and processor 522 may be implemented in the form of one or more single-core processors, one or more multi-core processors, or one or more CISC or RISC processors. That is, even though a singular term "a processor" is used herein to refer to processor 512 and processor 522, each of processor 512 and processor 522 may include multiple processors in some implementations and a single processor in other implementations in accordance with the present disclosure. In another aspect, each of processor 512 and processor 522 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 512 and processor 522 is a special-purpose machine specifically designed, arranged and configured to perform specific tasks including those pertaining to handling of MUSIM gaps collision in mobile communications in accordance with various implementations of the present disclosure.

In some implementations, apparatus 510 may also include a transceiver 516 coupled to processor 512. Transceiver 516 may be capable of wirelessly transmitting and receiving data. In some implementations, transceiver 516 may be capable of wirelessly communicating with different types of wireless networks of different radio access technologies (RATs). In some implementations, transceiver 516 may be equipped with a plurality of antenna ports (not shown) such as, for example, four antenna ports. That is, transceiver 516 may be equipped with multiple transmit antennas and multiple receive antennas for multiple-input multiple-output (MIMO) wireless communications. In some implementations, apparatus 520 may also include a transceiver 526 coupled to processor 522. Transceiver 526 may include a transceiver capable of wirelessly transmitting and receiving data. In some implementations, transceiver 526 may be capable of wirelessly communicating with different types of UEs/wireless networks of different RATs. In some implementations, transceiver 526 may be equipped with a plurality of antenna ports (not shown) such as, for example, four antenna ports. That is, transceiver 526 may be equipped with multiple transmit antennas and multiple receive antennas for MIMO wireless communications.

In some implementations, apparatus 510 may further include a memory 514 coupled to processor 512 and capable of being accessed by processor 512 and storing data therein. In some implementations, apparatus 520 may further include a memory 524 coupled to processor 522 and capable of being accessed by processor 522 and storing data therein. Each of memory 514 and memory 524 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 514 and memory 524 may include a type of read-only memory (ROM) such as mask ROM, programmable ROM (PROM), erasable programmable ROM (EPROM) and/or electrically erasable programmable ROM (EEPROM). Alternatively, or additionally, each of memory 514 and memory 524 may include a type of non-volatile random-access memory (NVRAM) such as flash memory, solid-state memory, ferroelectric RAM (Fe-RAM), magnetoresistive RAM (MRAM) and/or phase-change memory. Alternatively, or additionally, each of memory 514 and memory 524 may include a U ICC.

Each of apparatus 510 and apparatus 520 may be a communication entity capable of communicating with each other using various proposed schemes in accordance with the present disclosure. For illustrative purposes and without limitation, a description of capabilities of apparatus 510, as a UE (e.g., UE 110), and apparatus 520, as a network node (e.g., terrestrial network node 125 or non-terrestrial network node 128) of a wireless network (e.g., wireless network 120), is provided below.

Under certain proposed schemes in accordance with the present disclosure with respect to handling of MUSIM gaps collision in mobile communications, processor 512 of apparatus 510, implemented in or as a MUSIM UE (e.g., UE 110), may apply different priorities with respect to MUSIM gaps and one or more legacy MGs. Moreover, processor 512 may perform, via transceiver 516, wireless communications such that a collision between MUSIM gaps and legacy MGs is handled.

In some implementations, in applying the different priorities, processor 512 may apply the different priorities which are configured by a network (e.g., network 120 via apparatus 520).

In some implementations, prior to the applying, processor 512 may perform additional operations. For instance, processor 512 may receive, via transceiver 516, from the network a configuration of a dedicated priority with respect to each gap of the MUSIM gaps and legacy MGs. Moreover, processor 512 may apply the configuration with respect to each gap of the MUSIM gaps and legacy MGs. In some implementations, the dedicated priority may include a group priority applicable to the MUSIM gaps as a group and legacy MGs as another group. Alternatively, the dedicated priority may include an individual priority applicable to each gap of the MUSIM gaps and legacy MGs.

In some implementations, in applying the different priorities, processor 512 may apply the different priorities which are requested by the UE from a network (e.g., network 120 via apparatus 520).

In some implementations, prior to the applying, processor 512 may perform additional operations. For instance, processor 512 may determine a dedicated priority with respect to each gap of the MUSIM gaps and legacy MGs. Moreover, processor 512 may transmit, via transceiver 516, to the network a request. Also, processor 512 may receive, via transceiver 516, from the network a configuration of the dedicated priority with respect to each gap of the MUSIM gaps and legacy MGs responsive to the transmitting of the request. Furthermore, processor 512 may apply the configuration with respect to each gap of the MUSIM gaps and legacy MGs. In some implementations, the dedicated priority may include a group priority applicable to the MUSIM gaps as a group and legacy MGs as another group. Alternatively, the dedicated priority may include an individual priority applicable to each gap of the MUSIM gaps and legacy MGs.

In other implementations, prior to the applying, processor 512 may perform additional operations. For instance, processor 512 may determine a dedicated priority with respect to each gap of the MUSIM gaps. Also, processor 512 may transmit, via transceiver 516, to the network a request.

Moreover, processor 512 may receive, via transceiver 516, from the network a configuration of the dedicated priority with respect to each gap of the MUSIM gaps and legacy MGs responsive to the transmitting of the request. Furthermore, processor 512 may apply the configuration with respect to each gap of the MUSIM gaps and legacy MGs.

Illustrative Processes

FIG. 6 illustrates an example process 600 in accordance with an implementation of the present disclosure. Process 600 may represent an aspect of implementing various proposed designs, concepts, schemes, systems and methods described above, whether partially or entirely, including those described above. More specifically, process 600 may represent an aspect of the proposed concepts and schemes pertaining to handling of MUSIM gaps collision in mobile communications. Process 600 may include one or more operations, actions, or functions as illustrated by one or more of blocks 610 and 620. Although illustrated as discrete blocks, various blocks of process 600 may be divided into additional blocks, combined into fewer blocks, or eliminated, depending on the desired implementation. Moreover, the blocks/sub-blocks of process 600 may be executed in the order shown in FIG. 6 or, alternatively in a different order. Furthermore, one or more of the blocks/sub-blocks of process 600 may be executed iteratively. Process 600 may be implemented by or in apparatus 510 and apparatus 520 as well as any variations thereof. Solely for illustrative purposes and without limiting the scope, process 600 is described below in the context of apparatus 510 as a UE (e.g., UE 110) and apparatus 520 as a communication entity such as a network node or base station (e.g., terrestrial network node 125 or non-terrestrial network node 128) of a network (e.g., wireless network 120). Process 600 may begin at block 610.

At 610, process 600 may involve processor 512 of apparatus 510, implemented in or as a MUSIM UE (e.g., UE 110), applying different priorities with respect to MUSIM gaps and one or more legacy MGs. Process 600 may proceed from 610 to 620.

At 620, process 600 may involve processor 512 performing, via transceiver 516, wireless communications such that a collision between MUSIM gaps and legacy MGs is handled.

In some implementations, in applying the different priorities, process 600 may involve processor 512 applying the different priorities which are configured by a network (e.g., network 120 via apparatus 520).

In some implementations, prior to the applying, process 600 may involve processor 512 performing additional operations. For instance, process 600 may involve processor 512 receiving, via transceiver 516, from the network a configuration of a dedicated priority with respect to each gap of the MUSIM gaps and legacy MGs. Moreover, process 600 may involve processor 512 applying the configuration with respect to each gap of the MUSIM gaps and legacy MGs. In some implementations, the dedicated priority may include a group priority applicable to the MUSIM gaps as a group and legacy MGs as another group. Alternatively, the dedicated priority may include an individual priority applicable to each gap of the MUSIM gaps and legacy MGs.

In some implementations, in applying the different priorities, process 600 may involve processor 512 applying the different priorities which are requested by the UE from a network (e.g., network 120 via apparatus 520).

In some implementations, prior to the applying, process 600 may involve processor 512 performing additional operations. For instance, process 600 may involve processor 512 determining a dedicated priority with respect to each gap of the MUSIM gaps and legacy MGs. Moreover, process 600 may involve processor 512 transmitting, via transceiver 516, to the network a request. Also, process 600 may involve processor 512 receiving, via transceiver 516, from the network a configuration of the dedicated priority with respect to each gap of the MUSIM gaps and legacy MGs responsive to the transmitting of the request. Furthermore, process 600 may involve processor 512 applying the configuration with respect to each gap of the MUSIM gaps and legacy MGs. In some implementations, the dedicated priority may include a group priority applicable to the MUSIM gaps as a group and legacy MGs as another group. Alternatively, the dedicated priority may include an individual priority applicable to each gap of the MUSIM gaps and legacy MGs.

In other implementations, prior to the applying, process 600 may involve processor 512 performing additional operations. For instance, process 600 may involve processor 512 determining a dedicated priority with respect to each gap of the MUSIM gaps. Also, process 600 may involve processor 512 transmitting, via transceiver 516, to the network a request. Moreover, process 600 may involve processor 512 receiving, via transceiver 516, from the network a configuration of the dedicated priority with respect to each gap of the MUSIM gaps and legacy MGs responsive to the transmitting of the request. Furthermore, process 600 may involve processor 512 applying the configuration with respect to each gap of the MUSIM gaps and legacy MGs.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   applying, by a processor of a multiple-Universal Subscriber Identity Modules (MUSIM) user equipment (UE), different priorities with respect to MUSIM gaps and legacy measurement gaps (MGs), wherein the different priorities are applied for each individual gap; and
   performing, by the processor, wireless communications such that a collision between MUSIM gaps and legacy MGs is handled.

2. The method of claim 1, wherein the applying of the different priorities comprises applying the different priorities which are configured by a network.

3. The method of claim 2, prior to the applying, further comprising:

receiving, by the processor, from the network a configuration of a dedicated priority with respect to each gap of the MUSIM gaps and legacy MGs; and applying, by the processor, the configuration with respect to each gap of the MUSIM gaps and the legacy MGs.

4. The method of claim 3, wherein the dedicated priority comprises a group priority applicable to the MUSIM gaps as a group and the legacy MGs as another group.

5. The method of claim 3, wherein the dedicated priority comprises an individual priority applicable to each gap of the MUSIM gaps and the legacy MGs.

6. The method of claim 1, wherein the applying of the different priorities comprises applying the different priorities which are requested by the UE from a network.

7. The method of claim 6, prior to the applying, further comprising:

determining, by the processor, a dedicated priority with respect to each gap of the MUSIM gaps and the legacy MGs;

transmitting, by the processor, to the network a request;

receiving, by the processor, from the network a configuration of the dedicated priority with respect to each gap of the MUSIM gaps and the legacy MGs responsive to the transmitting of the request; and applying, by the processor, the configuration with respect to each gap of the MUSIM gaps and the legacy MGs.

8. The method of claim 7, wherein the dedicated priority comprises a group priority applicable to the MUSIM gaps as a group and the legacy MGs as another group.

9. The method of claim 7, wherein the dedicated priority comprises an individual priority applicable to each gap of the MUSIM gaps and the legacy MGs.

10. The method of claim 6, prior to the applying, further comprising:

determining, by the processor, a dedicated priority with respect to each gap of the MUSIM gaps;

transmitting, by the processor, to the network a request;

receiving, by the processor, from the network a configuration of the dedicated priority with respect to each gap of the MUSIM gaps and the legacy MGs responsive to the transmitting of the request; and applying, by the processor, the configuration with respect to each gap of the MUSIM gaps and the legacy MGs.

11. An apparatus implementable in a multiple-Universal Subscriber Identity Modules (MUSIM) user equipment (UE), comprising:

a transceiver which, during operation, communicates wirelessly; and a processor coupled to the transceiver and which, during operation, performs operations comprising:

applying different priorities with respect to MUSIM gaps and legacy measurement gaps (MGs), wherein the different priorities are applied for each Individual gap; and performing, via the transceiver, wireless communications such that a collision between MUSIM gaps and legacy MGs is handled.

12. The apparatus of claim 11, wherein the applying of the different priorities comprises applying the different priorities which are configured by a network.

13. The apparatus of claim 12, prior to the applying, the processor further performs operations comprising:

receiving, by the processor, from the network a configuration of a dedicated priority with respect to each gap of the MUSIM gaps and the legacy MGs; and applying, by the processor, the configuration with respect to each gap of the MUSIM gaps and the legacy MGs.

14. The apparatus of claim 13, wherein the dedicated priority comprises a group priority applicable to the MUSIM gaps as a group and the legacy MGs as another group.

15. The apparatus of claim 13, wherein the dedicated priority comprises an individual priority applicable to each gap of the MUSIM gaps and the legacy MGs.

16. The apparatus of claim 11, wherein the applying of the different priorities comprises applying the different priorities which are requested by the UE from a network.

17. The apparatus of claim 16, prior to the applying, the processor further performs operations comprising:

determining, by the processor, a dedicated priority with respect to each gap of the MUSIM gaps and the legacy MGs;

transmitting, by the processor, to the network a request;

receiving, by the processor, from the network a configuration of the dedicated priority with respect to each gap of the MUSIM gaps and the legacy MGs responsive to the transmitting of the request; and applying, by the processor, the configuration with respect to each gap of the MUSIM gaps and the legacy MGs.

18. The apparatus of claim 17, wherein the dedicated priority comprises a group priority applicable to the MUSIM gaps as a group and the legacy MGs as another group.

19. The apparatus of claim 17, wherein the dedicated priority comprises an individual priority applicable to each gap of the MUSIM gaps and the legacy MGs.

20. The apparatus of claim 16, prior to the applying, the processor further performs operations comprising:

determining, by the processor, a dedicated priority with respect to each gap of the MUSIM gaps;

transmitting, by the processor, to the network a request;

receiving, by the processor, from the network a configuration of the dedicated priority with respect to each gap of the MUSIM gaps and the legacy MGs responsive to the transmitting of the request; and applying, by the processor, the configuration with respect to each gap of the MUSIM gaps and the legacy MGs.

* * * * *